No. 673,266. Patented Apr. 30, 1901.
A. S. HUBBARD.
BOOSTER REGULATING SYSTEM FOR STORAGE BATTERY CIRCUITS.
(Application filed Mar. 2, 1901.)
(No Model.) 2 Sheets—Sheet 1.
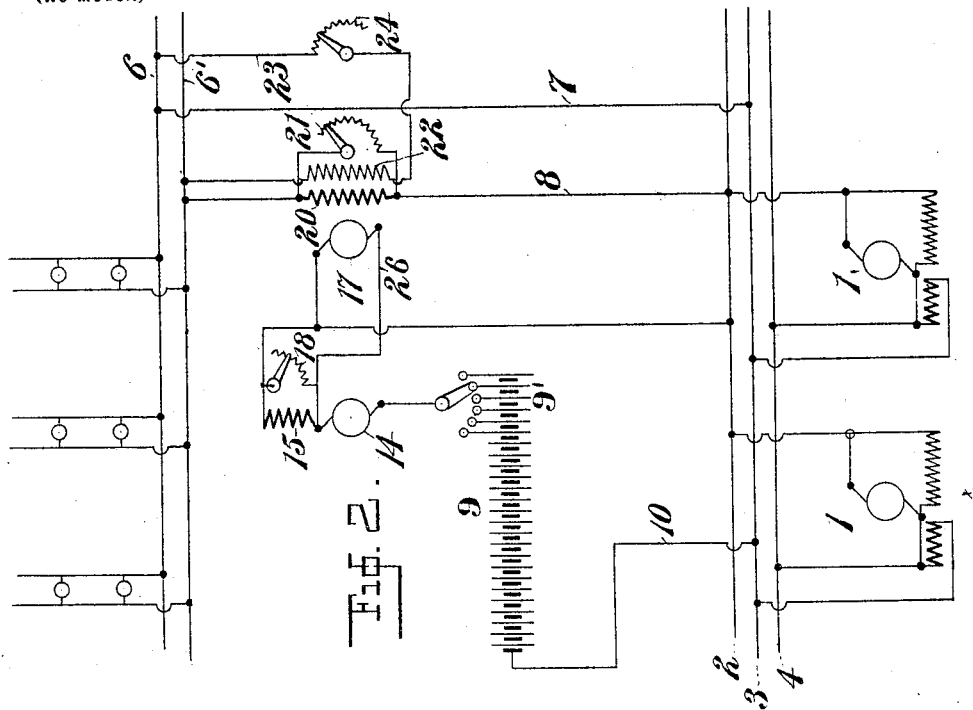
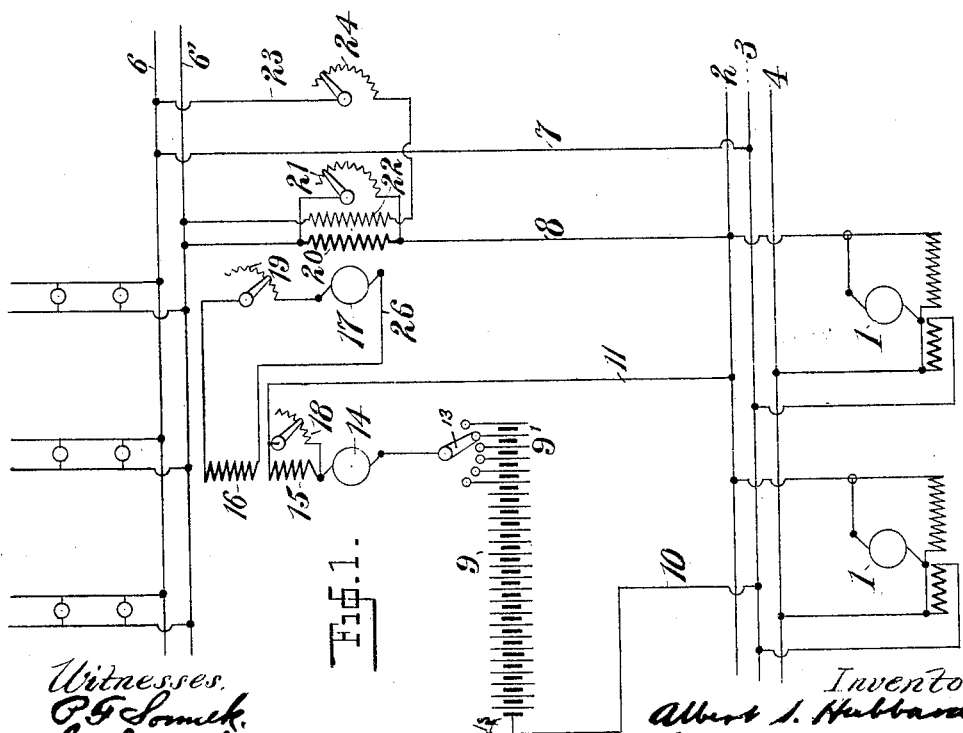
Witnesses. Inventor.
Albert S. Hubbard No. 673,266. Patented Apr. 30, 1901.
A. S. HUBBARD.
BOOSTER REGULATING SYSTEM FOR STORAGE BATTERY CIRCUITS.
(Application filed Mar. 2, 1901.)
(No Model.) 2 Sheets—Sheet 2.

Witnesses.
Inventor.
Albert S. Hubbard ized.

UNITED STATES PATENT OFFICE.

ALBERT S. HUBBARD, OF BELLEVILLE, NEW JERSEY, ASSIGNOR TO GOULD STORAGE BATTERY COMPANY, OF NEW YORK, N. Y.

BOOSTER-REGULATING SYSTEM FOR STORAGE-BATTERY CIRCUITS.

SPECIFICATION forming part of Letters Patent No. 673,266, dated April 30, 1901.

Application filed March 2, 1901. Serial No. 49,633. (No model.)

*To all whom it may concern:*

Be it known that I, ALBERT S. HUBBARD, a citizen of the United States, residing at Belleville, in the county of Essex and State of New Jersey, have invented certain new and useful Improvements in Booster-Regulating Systems for Storage-Battery Circuits, of which the following is a specification.

The invention relates to booster-regulating systems for storage-battery circuits; and its object is to render the booster regulation independent of the battery electromotive force and dependent only upon the load. In such a system the regulation for variation of battery electromotive force is intended to be effected by regulating cell or "end cells," which are switched out of circuit as the battery electromotive force rises in charging. In the present invention the booster is so regulated that it is not responsive to such variations in the battery electromotive force and has to respond only to variations in the load.

Figure 4:
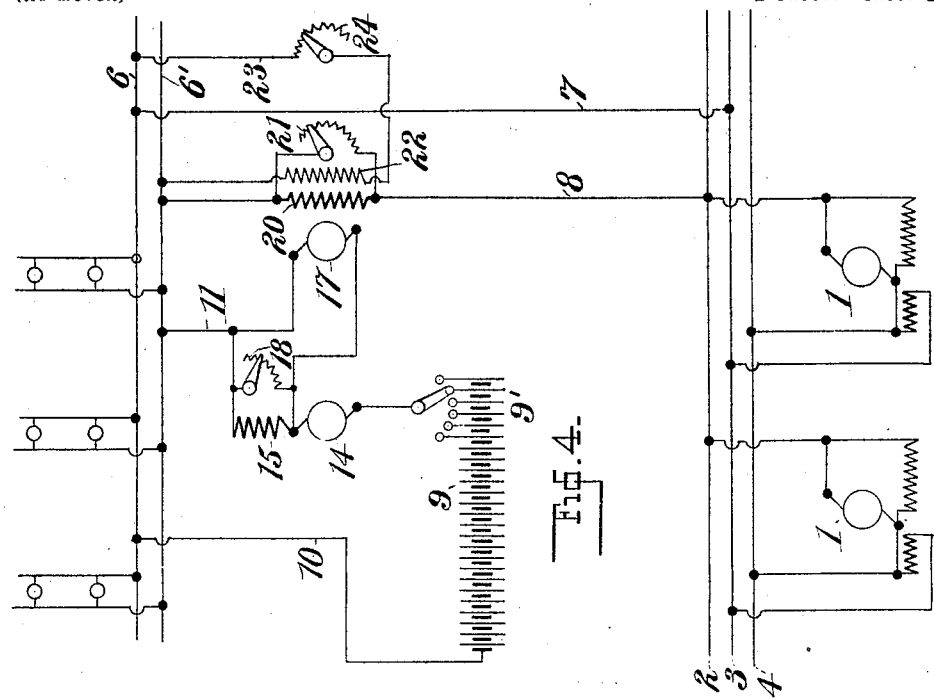
Figure 5:
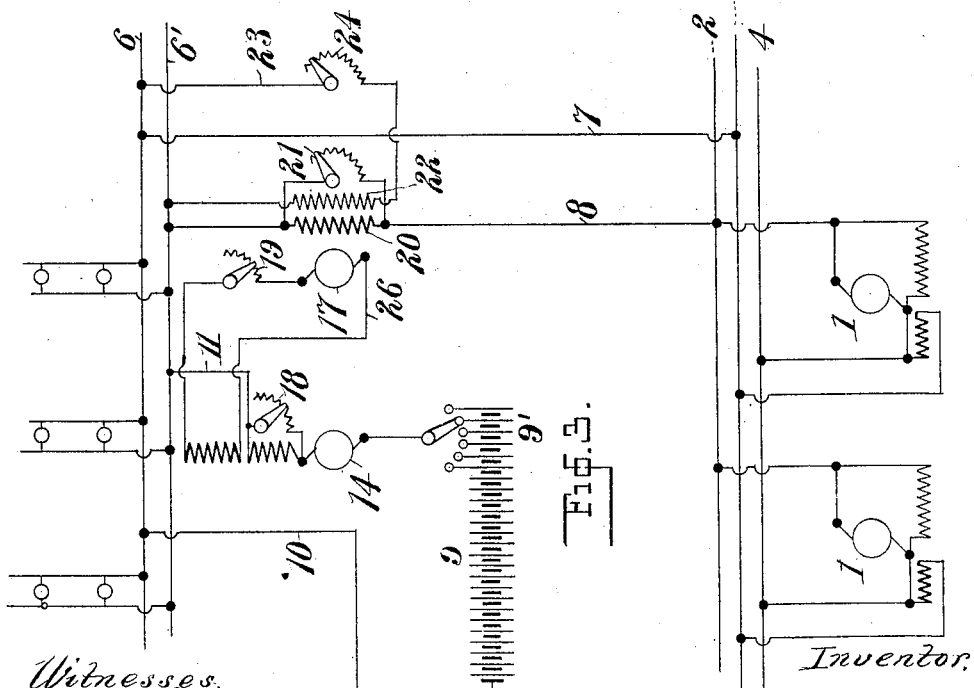

In the accompanying drawings, forming a part of this specification, Figure 1 is a diagram of a system of distribution embodying my invention. Figs. 2 to 4 show modifications.

Referring to Fig. 1, the main generators or dynamos are indicated at 1 and are connected with bus-bars 2 3 4, the armatures and shunt-coils of the dynamos being connected across bus-bars 2 4 and the series coils being connected across bus-bars 3 and 4. The two sides or wires 6 6' of the working or consumption circuit are connected, respectively, by connection 7 with bus-bar 3 and by connection 8 with bus-bar 2. Storage battery 9 is also connected between bus-bars 2 3 by wires 10 11, this connection including also the regulating end cells 9', end-cell switch 13, the armature 14, and field-magnet coil 15 of the booster, a rheostat 18 being connected in shunt with the field-magnet coil 15. The booster is compound wound, being provided with another field-magnet coil 16, that tends during charging to oppose the action of coil 15 and is supplied with current from a source that is responsive to the load, but is practically not responsive to changes in electromotive force of the storage battery. For this purpose I may employ a generator whose armature (shown at 17) is connected by wire 26 with the field-magnet coil 16 through a regulating-rheostat 19 and whose main field-magnet coil 20 is in series connection with the load, being included in the connection 8 from bus-bar 2 to the working circuit. To provide for regulation of this exciting-generator, it may have a rheostat 21 in shunt with its field-magnet or it may be provided with an auxiliary field-coil 22, connected across the work-circuit 6 6' by a connection 23, including a regulating-rheostat 24, or, as shown, both of these means may be provided.

In practical operation, considering the storage battery as being neutral and the capacity of the generator equal to the load on the line, under these circumstances the magnetic effect of the series coil 20 on the auxiliary generator is balanced by the magnetic effect of the shunt-coil 21, and the armature 17 of auxiliary generator generates no electromotive force. Consequently the booster-field being energized by current from the auxiliary generator and by current from or to the battery, or the difference between the two, its electromotive force is zero, and consequently the batteries neither charge nor discharge. Upon a decrease of load in the main circuit the magnetic effect of shunt-coil on auxiliary generator preponderates, and the auxiliary generator generates a current which energizes the field of the booster by coil 16, causing an electromotive force to be generated by the booster in such a direction as to aid the dynamos in forcing a charging-current into the battery. This charging-current circulates through the other coil 15 in such a direction as to cut down the magnetism of the booster-field. In other words, on a charge the two booster-coils 15 16 operate differentially, and the amount of current entering the battery as a charge is proportional to the difference between the two coils on the booster. Considering the coil 15 in series with the booster-armature as being cut out of circuit and only the coil energized by current from the auxiliary generator as energizing the booster-field, the electromotive force of auxiliary generator we will consider as being constant for the time being. Under these circumstances the booster electromotive force would be constant, and the current entering the battery as a charge would gradually decrease as the battery counter electromotive force rose during charge, the current entering the battery being inversely proportional to the counter electromotive force until such a point was reached where the current entering the battery would become practically zero. Now consider the coil 16, energized by the current from the auxiliary generator, as cut out and only the coil in series with the battery as working. Under these circumstances this series coil being so wound as to cause the booster to generate a current to oppose the entry of any current into the battery as a charge the effect of this coil would be to make the battery-charging current become practically zero. The effect of the two coils working in conjunction would therefore be to gradually cut down the current entering the battery as a charge, and such cutting down of the current would be not proportional to the rise of counter electromotive force in the battery, but proportional to the effect of the two coils, and the charging effect of the booster would decrease as the battery voltage increases. Considering the load in the external circuit as greater than that for which the shunt-coil on auxiliary generator is set, the current passing through series coil on auxiliary generator causes its magnetic effect to preponderate, and the auxiliary generator generates a current which energizes the booster-field so as to cause the booster to generate a current in such a direction as to aid the electromotive force of the battery. Considering this coil on the booster as to be alone active and the electromotive force generated by auxiliary generator as constant, the booster electromotive force would be constant also, and the current leaving the battery as a discharge would gradually reduce as the electromotive force of the battery dropped during discharge. Considering the coil on the booster-field in series with the battery as being alone active, it being differential to the separately-excited coil, its effect would be to reduce the booster electromotive force to practically zero and prevent a discharge of the battery. The effect of the two coils working in conjunction will be to reduce the current leaving the battery as a discharge.

In Fig. 2 I have shown a system for producing the same results as in Fig. 1 by means of a single winding 15 on the booster-field energized jointly by the battery-current (said coil being in series with the battery) and by an auxiliary shunt-dynamo, whose armature 17 is connected across the terminals of said field-magnet by a circuit 26, the arrangement being such that in charging the auxiliary generator acts differentially by shunting more or less current from the coil 15. The operation of this system is similar to that shown in Fig. 1, but may be explained in detail as follows: Considering the booster to have a constant speed and constant field excitation, its voltage would remain constant, and the dynamo voltage being constant also the electromotive force applied to the battery-terminals (being these two electromotive forces in series) would be constant also. The current under these circumstances would drop as the battery electromotive force rose during charge. The current on a discharge would drop also, owing to the fall of electromotive force in the battery during discharge.

Substituting for the constant field excitation the excitation produced by a winding-in series with the battery charge and discharge circuits the effects will be as follows: First, on a charge the current will drop owing to the rise of counter electromotive force of the battery as the charging proceeds; second, on a charge the current will drop owing to the reduction of field-strength occasioned by the reduction of current in the series coil, due to the rise of battery counter electromotive force; third, on a discharge the current will drop owing to the reduction of battery electromotive force as the discharge continues, which drop will be to a greater or less extent proportional to the discharge rate, and, fourth, on a discharge the current will drop owing to the reduction of field-strength occasioned by the reduction of current in the series coil, due to the drop of battery electromotive force, and the higher the discharge rate the greater the booster electromotive force will be.

In ordinary operation for regulating on fluctuating loads such as exist in trolley service the battery is worked between very narrow limits of electromotive force and counter electromotive force in order to obtain the highest efficiency. Under these circumstances it is of advantage to have the charge stop before the counter electromotive force starts to rise at the latter part of the charge and to have the discharge stop before the battery electromotive force starts to drop rapidly at the latter part of the discharge, thus avoiding the high and inefficient counter electromotive force at the end of the charge and the low and inefficient electromotive force at the end of the discharge.

The function of the variable auxiliary shunting-generator 17 is to bring the series booster back to the condition of a shunt-machine, a separately-excited machine, or a compounded or overcompounded machine, as is desired, which effects are obtained as more or less counter electromotive force or electromotive force is applied to the series coil on the booster. Increase of electromotive force in auxiliary shunting-generator increases the effect of the series coil on the booster if such electromotive force is opposed to the counter electromotive force of the series coil; otherwise its effect is to reduce the effect of the series coil. Upon further increase of electromotive force in auxiliary shunting-generator the effect of series will be reversed, causing the batteries to discharge.

The auxiliary shunting-generator has a field energized by a series and a shunt coil. The series coil is connected in the main circuit and so wound with relation to the auxiliary shunting-generator armature that, considering the battery to be charging, increased current passing from the main generator causes the field-strength to be increased and the armature generates a current which is so connected as to reduce the excitation of the series field of the booster by shunting a portion or all of the current away from it, by which means the booster electromotive force is lowered and the battery stops charging. Further increase of current through series coil on auxiliary shunting-generator causes the effect of series coil on booster to be reversed and its armature electromotive force, instead of opposing the counter electromotive force of the batteries, helps their discharge.

The effects and purposes of the shunt-coil on auxiliary shunting-generator are, first, to limit the current output from the generator; second, to neutralize the effect of series coil for normal load, and, third, to limit the current output of the batteries. This coil is wound differentially to the series coil.

The effect of series coil on the booster can be varied by means of the variable shunt, as shown, by commutating the coil (by a multiple-series arrangement) or by cutting in or out turns of the winding. The effect of series coil on auxiliary shunting-generator can be similarly varied. The effect of shunt-coil on auxiliary shunting-generator can be varied by means of the rheostat. The effect of auxiliary shunting-generator on the series coil of the booster can be varied by means of the variable resistance in series with them, and by means of shunt-coil 22 the charging or discharging action may be made to preponderate, as desired.

Figs. 3 and 4 show systems similar to Figs. 1 and 2, respectively, but with the storage battery and booster-circuit connected directly across the working wires 6 6' independent of the field-coil 20 of the auxiliary shunt-generator. The effect is in most respects the same, but the action of the generator 17 will not be quite so constant, and in case of a shut-down of the dynamo the regulation is effected by shunt-coil 22 alone.

Having thus described my invention, what I claim as new therein, and desire to secure by Letters Patent, is—

1. In a system of distribution, the combination with the main generating source, and work-circuit, and a storage battery connected therewith, of a booster having its armature connected in circuit with the battery and having its field-magnet energized by circuit connections responsive to variation of battery-potential to cut down the battery-current on excessive variation in either direction.

2. In a system of distribution, the combination with the main generating source and work-circuit and a storage battery connected thereto, of a booster having its armature connected in circuit with the battery and having its field-magnet energized by circuit connections independent of the battery and by circuit connections in series with the battery.

3. In a system of distribution, the combination with the main generating source and work-circuit, and a storage battery connected thereto, of a booster having its armature in series with the storage battery and having two field-exciting coils, one of such coils being in series with the storage battery, and an auxiliary generator connected to the other coil.

4. In a system of distribution, the combination with the main generating source and work-circuit, and a storage battery connected thereto, of a booster having its armature in series with the storage battery and an auxiliary generator connected to and exciting the field-magnet of said booster.

5. The combination with a storage battery, and a work-circuit, of a booster having its armature in series with the storage battery and an auxiliary generator connected to excite the field-magnet of said booster.

6. The combination with a storage battery, and a work-circuit, of a booster having its armature in series with the storage battery and an auxiliary generator connected to excite the field-magnet of said booster and energizing connections for said auxiliary generator, responsive to the load in the work-circuit.

7. The combination with a storage battery, and a work-circuit, of a booster having its armature in series with the storage battery and an auxiliary generator connected to excite the field-magnet of said booster said auxiliary generator having an energizing field-coil in series with the work-circuit.

8. The combination with a storage battery, and a work-circuit, of a booster having its armature in series with the storage battery and an auxiliary generator connected to excite the field-magnet of said booster, said auxiliary generator being a field-coil in shunt with the work-circuit.

9. The combination with a storage battery, and a work-circuit, of a booster having its armature in series with the storage battery and an auxiliary generator connected to excite the field-magnet of said booster, said auxiliary generator having differentially-wound coils connected in series and shunt relation with the work-circuit.

10. The combination with a storage battery and a work-circuit, of a booster having its armature in circuit with the storage battery and having a field-magnet energized by connection in series with the battery and an energizing-circuit for the booster field-magnet including an auxiliary generator.

11. The combination with a storage battery and a work-circuit, of a booster having its armature in circuit with the storage battery and having a field-magnet energized by connection in series with the battery and an energizing-circuit for the booster field-magnet including an auxiliary generator, and means for controlling said auxiliary generator responsively to the load in the work-circuit.

12. The combination with a storage battery and a work-circuit, of a booster having its armature in circuit with the storage battery, and having two field-energizing circuits, one of which is responsive to the load in the work-circuit, while the other is responsive to excessive variation of battery-potential to cut down the battery-current in charging or discharging.

ALBERT S. HUBBARD.

Witnesses:
ARTHUR P. KNIGHT,
J. GREEN.